(12) United States Patent
Hashemi (10) Patent No.: US 6,934,804 B2
(45) Date of Patent: Aug. 23, 2005

(54) METHOD AND SYSTEM FOR STRIPING SPARES IN A DATA STORAGE SYSTEM INCLUDING AN ARRAY OF DISK DRIVES

(75) Inventor: Ebrahim Hashemi, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 419 days.

(21) Appl. No.: 10/157,333

(22) Filed: May 28, 2002

(65) Prior Publication Data

US 2003/0225970 A1 Dec. 4, 2003

(51) Int. Cl.⁷ .............................................. G06F 12/00
(52) U.S. Cl. ......................................... 711/114; 714/6
(58) Field of Search ............................... 711/114; 714/6

(56) References Cited

U.S. PATENT DOCUMENTS

| | | | |
|---|---|---|---|
| 5,258,984 A | * 11/1993 | Menon et al. ................. | 714/7 |
| 5,485,571 A | * 1/1996 | Menon .......................... | 714/7 |
| 5,488,701 A | * 1/1996 | Brady et al. .................. | 714/6 |
| 5,499,253 A | 3/1996 | Lary | |
| 5,579,475 A | * 11/1996 | Blaum et al. ................. | 714/7 |
| 5,651,133 A | 7/1997 | Burkes et al. | |
| 5,657,439 A | * 8/1997 | Jones et al. ................... | 714/7 |
| 5,666,512 A | 9/1997 | Nelson et al. | |
| 5,708,668 A | 1/1998 | Styczinski | |
| 6,079,029 A | 6/2000 | Iwatani et al. | |
| 6,154,853 A | 11/2000 | Kedem | |
| 6,529,997 B1 | * 3/2003 | Debiez et al. ............... | 711/114 |
| 6,530,035 B1 | 3/2003 | Bridge | |
| 6,546,458 B2 | * 4/2003 | Milligan et al. ............ | 711/114 |
| 6,557,123 B1 | 4/2003 | Wiencko et al. | |
| 6,721,794 B2 | * 4/2004 | Taylor et al. ............... | 709/231 |
| 6,845,465 B2 | 1/2005 | Hashemi | |
| 2003/0088803 A1 | * 5/2003 | Arnott et al. ................. | 714/5 |
| 2003/0115412 A1 | * 6/2003 | Franklin et al. ............ | 711/114 |

OTHER PUBLICATIONS

Mark Holland, "On–Line Data Reconstruction In Redundant Disk Arrays," Parallel Data Laboratory, Carnegie Mellon University, CMU–CS–94–164, (240 pages) May 1994.

Lee et al., "Performance Consequences of Parity Placement in Disk Arrays," ACM 0–89791–380–9/91/0003–0190, © 1991.

Menon et al., "Comparison of Sparing Alternatives for Disk Arrays," ACM 0–89791–509–7/92/0005/0318, © 2002.

David A Patterson, Garth Gibson, and Randy H. Katz; A Case for Redundant Arrays of Inexpensive Disks (RAID); 1988; Univerisity of Berkeley, Callifornia.

* cited by examiner

*Primary Examiner*—Kevin Verbrugge
(74) *Attorney, Agent, or Firm*—Robert C. Kowert; Meyertons, Hood, Kivlin, Kowert & Goetzel, P.C.

(57) ABSTRACT

Method and apparatus for striping spare storage in a data storage system. Specifically the present invention describes a method and apparatus for storing data and spare storage in a data storage system having a plurality of physical storage devices. The plurality of physical storage devices is partitioned into a plurality of slices. Logical units of storage (LUNs) are created, wherein each LUN contains data, spare, and data redundancy. Each of the plurality of slices is assigned to one of the plurality of LUNs so as to distribute storage of data, data redundancy, and spare across all of the plurality of physical storage devices. Distribution of spare storage is concentrated at the inner zone of each of the plurality of physical storage devices. The data and spare storage can be distributed uniformly or with varying granularities across all of the plurality of physical storage devices.

34 Claims, 9 Drawing Sheets

|  | Disk 0 (A302) | Disk 1 (A304) | Disk 2 (A306) | Disk 3 (A308) | Disk 4 (A310) | Disk 5 (A312) | Disk 6 (A314) | Disk 7 (A316) |
|---|---|---|---|---|---|---|---|---|
| SLICE LAYER 0 (A-320) | LUN 0 | LUN 0 | LUN 0 | LUN 0 | LUN 0 | LUN 1 | LUN 1 | LUN 1 |
| SLICE LAYER 1 (A-322) | LUN 1 | LUN 1 | LUN 2 | LUN 2 | LUN 2 | LUN 2 | LUN 2 | LUN 3 |
| SLICE LAYER 2 (A-324) | LUN 3 | LUN 3 | LUN 3 | LUN 3 | LUN 4 | LUN 4 | LUN 4 | LUN 4 |
| SLICE LAYER 3 (A-326) | LUN 4 | LUN 5 | LUN 5 | LUN 5 | LUN 5 | LUN 5 | LUN 6 | LUN 6 |
| SLICE LAYER 4 (A-328) | LUN 6 | LUN 6 | LUN 6 | LUN 7 | LUN 7 | LUN 7 | LUN 7 | LUN 7 |
| SLICE LAYER 5 (A-330) | LUN 2 SPARE | LUN 2 SPARE | LUN 1 SPARE | LUN 1 SPARE | LUN 1 SPARE | LUN 0 SPARE | LUN 0 SPARE | LUN 0 SPARE |
| SLICE LAYER 6 (A-332) | LUN 5 SPARE | LUN 4 SPARE | LUN 4 SPARE | LUN 4 SPARE | LUN 3 SPARE | LUN 3 SPARE | LUN 3 SPARE | LUN 2 SPARE |
| SLICE LAYER 7 (A-334) | LUN 7 SPARE | LUN 7 SPARE | LUN 7 SPARE | LUN 6 SPARE | LUN 6 SPARE | LUN 6 SPARE | LUN 5 SPARE | LUN 5 SPARE |

Fig. 3A

|  | Disk 0 (B302) | Disk 1 (B304) | Disk 2 (B306) | Disk 3 (B308) | Disk 4 (B310) | Disk 5 (B312) | Disk 6 (B314) | Disk 7 (B316) |
|---|---|---|---|---|---|---|---|---|
| SLICE LAYER 0 (B320) | LUN 0 | LUN 0 | LUN 0 | LUN 0 | LUN 0 | LUN 0 | LUN 0 | LUN 0 |
| SLICE LAYER 1 (B322) | LUN 0 | LUN 0 | LUN 0 | LUN 0 | LUN 1 | LUN 1 | LUN 1 | LUN 1 |
| SLICE LAYER 2 (B324) | LUN 1 | LUN 1 | LUN 1 | LUN 1 | LUN 1 | LUN 1 | LUN 1 | LUN 1 |
| SLICE LAYER 3 (B326) | LUN 2 | LUN 2 | LUN 2 | LUN 2 | LUN 2 | LUN 2 | LUN 2 | LUN 2 |
| SLICE LAYER 4 (B328) | LUN 2 | LUN 2 | LUN 2 | LUN 2 | LUN 3 | LUN 3 | LUN 3 | LUN 3 |
| SLICE LAYER 5 (B330) | LUN 3 | LUN 3 | LUN 3 | LUN 3 | LUN 3 | LUN 3 | LUN 3 | LUN 3 |
| SLICE LAYER 6 (B332) | LUN 1 SPARE | LUN 1 SPARE | LUN 1 SPARE | LUN 1 SPARE | LUN 0 SPARE | LUN 0 SPARE | LUN 0 SPARE | LUN 0 SPARE |
| SLICE LAYER 7 (B334) | LUN 3 SPARE | LUN 3 SPARE | LUN 3 SPARE | LUN 3 SPARE | LUN 2 SPARE | LUN 2 SPARE | LUN 2 SPARE | LUN 2 SPARE |

METHOD AND SYSTEM FOR STRIPING SPARES IN A DATA STORAGE SYSTEM INCLUDING AN ARRAY OF DISK DRIVES

BACKGROUND OF THE INVENTION

1. Field of the Invention

Embodiments of the present invention relate to the field of data storage systems. More particularly, embodiments of the present invention relate generally to the distribution of data and spare storage in a data storage system.

2. Related Art

Secondary data storage is an integral part of large data processing systems. A typical data storage system in the past utilized a single, expensive magnetic disk for storing large amounts of data. This single disk in general is accessed by the Central Processing Unit (CPU) through a separate Direct Memory Access (DMA) controller. The DMA controller then translates and executes the Input/Output (I/O) requests of the CPU. For single disk memory storage systems, the speed of data transfer to and from the single, large disk is much slower than the processing speed of the CPU and acts as a data processing bottleneck.

In response, redundant arrays of independent disks (RAIDs) have evolved from single disk storage systems in order to match the speed of secondary storage access with the increasingly faster processing speeds of the CPU. To increase system throughput, the RAID architecture of secondary storage allows for the concurrent access of data from multiple disk drives.

The concept for the RAID architecture was formalized in an article written by some members of the Department of Electrical Engineering and Computer Sciences at the University of California at Berkeley, entitled: "A Case for Redundant Arrays of Inexpensive Disks (RAID)," by D. A. Patterson, G. Gibson, and R. H. Katz, ACM SIGMOD Conference, Chicago, Ill., June 1988, hereinafter referred to as "Patterson et al."

Typically, RAID architectures consist of one or more host interface controllers connected to several peripheral interface controllers via a high speed data bus. Each peripheral interface controller is, in turn, connected to several individual disk drives which provide the secondary storage for the connected hosts. Peripheral interface controllers, also referred to as array controllers herein, can be connected to the disk drives via common communication interfaces (e.g., SCSI). Generally, the speed of the data bus is greater than the speed of the interface between the disk drives and the peripheral interface controllers.

In order to reconstruct lost data in a redundancy group due to a failed disk, the system must define a reversible mapping from the data and its redundancy data in the group containing the lost data. Patterson et al. describe in their paper several such mappings. One such mapping is the RAID level 4 (RAID-4) mapping that defines a group as an arbitrary number of disk drives containing data and a single redundancy disk. The redundancy disk is a separate disk apart from the data disks.

Another mapping, RAID level 5 (RAID-5), distributes the redundancy data across all the disks in the redundancy group. As such, there is no single or separately dedicated parity disk. As the number of disks in a RAID-5 array increases, the potential for increasing the number of overlapped operations also increases. In a RAID-4 configuration, the physical drive(s) containing the redundancy become(s) a bottleneck for small random write operations. RAID-5 configurations alleviate this problem by distributing the redundancy across all drives. Hence, the RAID-5 configuration results in better write performance over the RAID-4 configuration.

In order to recover from physical device failures (e.g., a disk), functions are used that generate redundancies of a group of stripe units (e.g., an XOR function). The redundancies, that regenerate data lost from physical device failures, are then mapped to distinct physical devices. Normally, each member of the group is stored and mapped to a different physical device in order to make the recovery possible. The set of functions form a set of equations with a unique solution. A single even parity function is commonly used and can recover from any single device failure in the group. Some implementations use two functions, generally referred to as P and Q parities, to recover from any two device failures in the group.

Moreover, in order to reduce the Mean Time to Repair (MTTR), one or more spare devices are included in the array to start reconstruction of data on a device as soon as the device failure is detected. Storage systems with additional spare disks are designed to operate continuously over a specified period of time, without requiring any repair of the system due to failed disks. This is accomplished by carefully identifying and quantifying the components that are expected to fail during a given time period, and incorporating within the system sufficient hot-spare parts or disks. This internal spare disk architecture can automatically switch to the spare disks when a failure is encountered. Spares are incorporated so that compatible disk devices are always at hand upon a disk failure.

Previously, data was contained on disks independent from disks containing spare storage. Exclusively using disks for containing data or for spare storage leads to both performance and reliability problems. For example, the mean time between failure (MTBR) for each disk containing data remains the same even though the MTTR for the entire system is increased with the additional spare disks. Since the disks containing data have equivalent MTBR, failure of each of the disks containing data will occur approximately within the same time period. However, once the failed disks are replaced with all available spare disks, the remaining failed disks cannot be replaced and the system will lose data.

Additionally, accessing data on disks containing only data requires full movement of the read/write head(s) throughout all tracks and sectors of a disk. In any accessing scheme, the time to failure of the mechanisms involving the read/write head(s) is at its shortest period with full access to all the sectors and tracks of the disk. Also, the average seek time for data remains unchanged when the spare storage is located independently from data storage.

SUMMARY OF THE INVENTION

Embodiments of the present invention disclose a method and system for distributing data and spare storage in a data storage system. Various embodiments of the present invention may increase the reliability and/or the performance of data storage system.

Specifically, a method and apparatus for striping spare storage in a data storage system are disclosed. Embodiments of the present invention include a method and apparatus for storing data and spare storage in a data storage system having a plurality of physical storage devices. The plurality of storage devices are partitioned into a plurality of slices. Logical units of storage (LUNs) are created, wherein each LUN contains data, spare, and data redundancy. Each of the plurality of slices is assigned to one of the plurality of LUNs so as to distribute storage of the data, data redundancy, and spare storage across all of the plurality of physical storage devices. In particular, spare storage is distributed to the inner zones of each of the plurality of physical storage devices in order to increase performance and reliability of the data storage system. The data and spare storage can be distributed uniformly or with varying granularities across all of the plurality of physical storage devices.

DETAILED DESCRIPTION OF THE INVENTION

Reference will now be made in detail to the preferred embodiments of the present invention, a method and system for distributing data and spare storage in a data storage system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "dividing," "creating," "assigning," "striping," "locating," "distributing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 1:
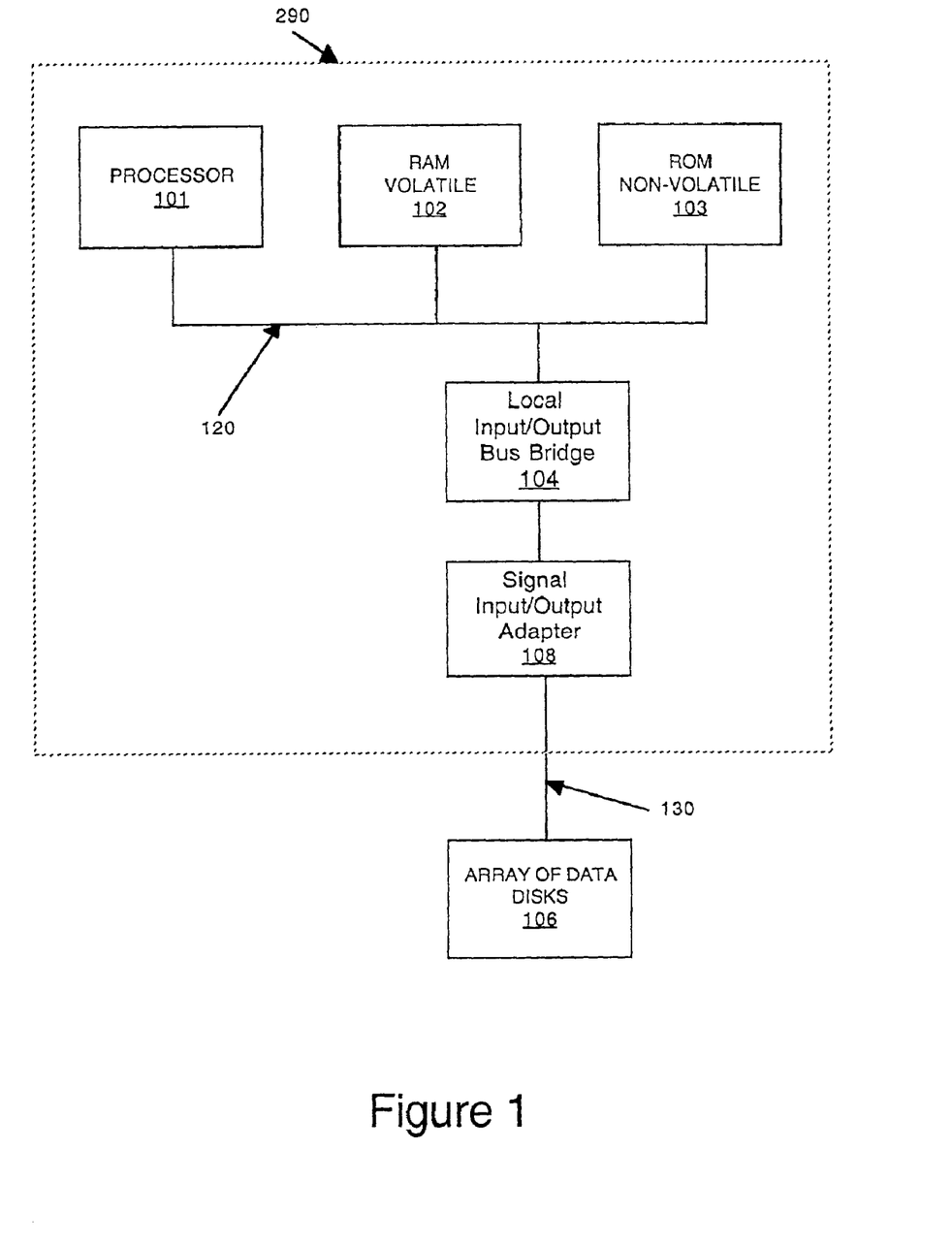
FIG. 1 is a logical block diagram of an exemplary array controller, in accordance with an embodiment of the present invention.

Referring now to FIG. 1, embodiments of the present invention are comprised of computer-readable and computer-executable instructions which reside, for example, in computer-readable media of an electronic system, such as an array controller or computer system. FIG. 1 is a block diagram of exemplary embedded components of an array controller 290 upon which embodiments of the present invention may be implemented. Exemplary array controller 290 includes an internal address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

With reference still to FIG. 1, an optional signal Input/Output (I/O) device 108 is shown. The I/O device 108 is coupled to bus 120 for providing a communication link between array controller 290 and an array of data storage devices, such as disks. As such, signal I/O device 108 enables the central processor unit 101 to communicate with or monitor other electronic systems blocks that are coupled to the array controller 290.

The input/output device 108 could be an I/O interface such as a serial or USB port that is associated with the bus 120, and/or any I/O bus (e.g., Peripheral Component Interface (PCI), or Interface Bus (IB)) that is connected to the bus 120 via possibly one or more bridges 104 (e.g., a PCI bridge or IB Host Channel Adapter (HCA)). Data from the array controller 290 travels through the I/O device 108 and onto an external bus 130 that provides for data transfer between components of the data storage system 200, including between array controller 290 and an array of disk drives 106.

Striping Spare Storage in a Data Storage System

Figure 3A:
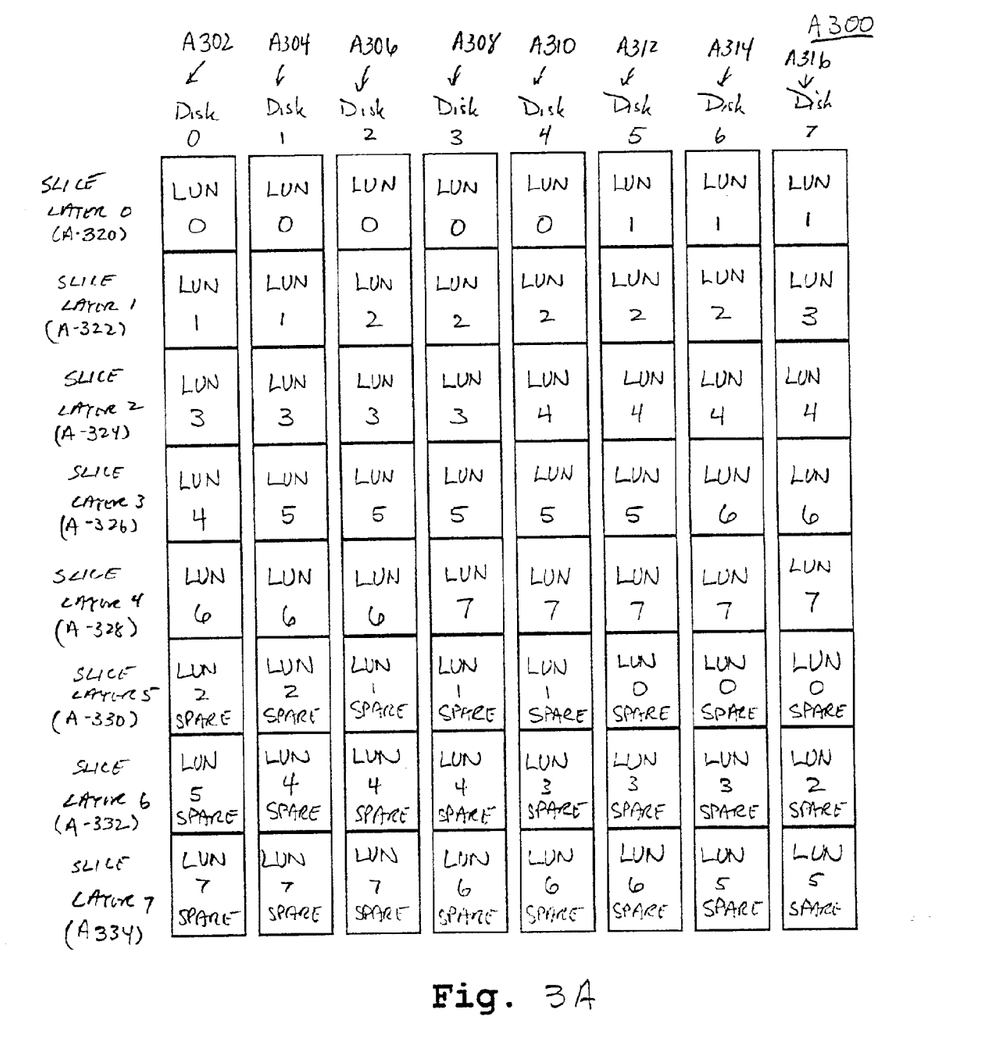
FIG. 3A illustrates a block diagram of an exemplary data storage system uniformly distributing data and spare storage in devices divided into eight slices, in accordance with one embodiment of the present invention.
Figure 3B:
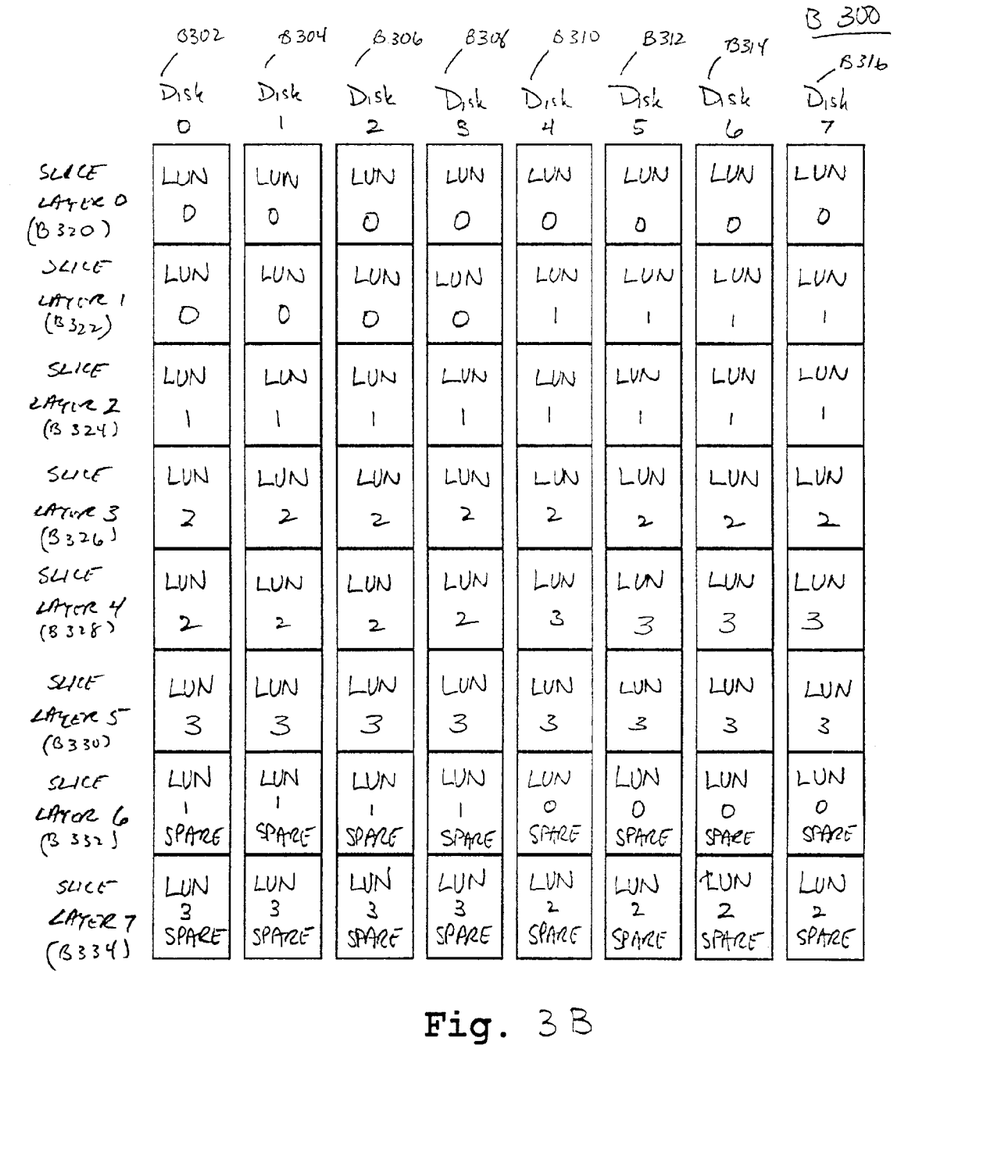
FIG. 3B illustrates a block diagram of an exemplary data storage system uniformly distributing data and spare storage in devices divided into eight slices, in accordance with one embodiment of the present invention.
Figure 3C:
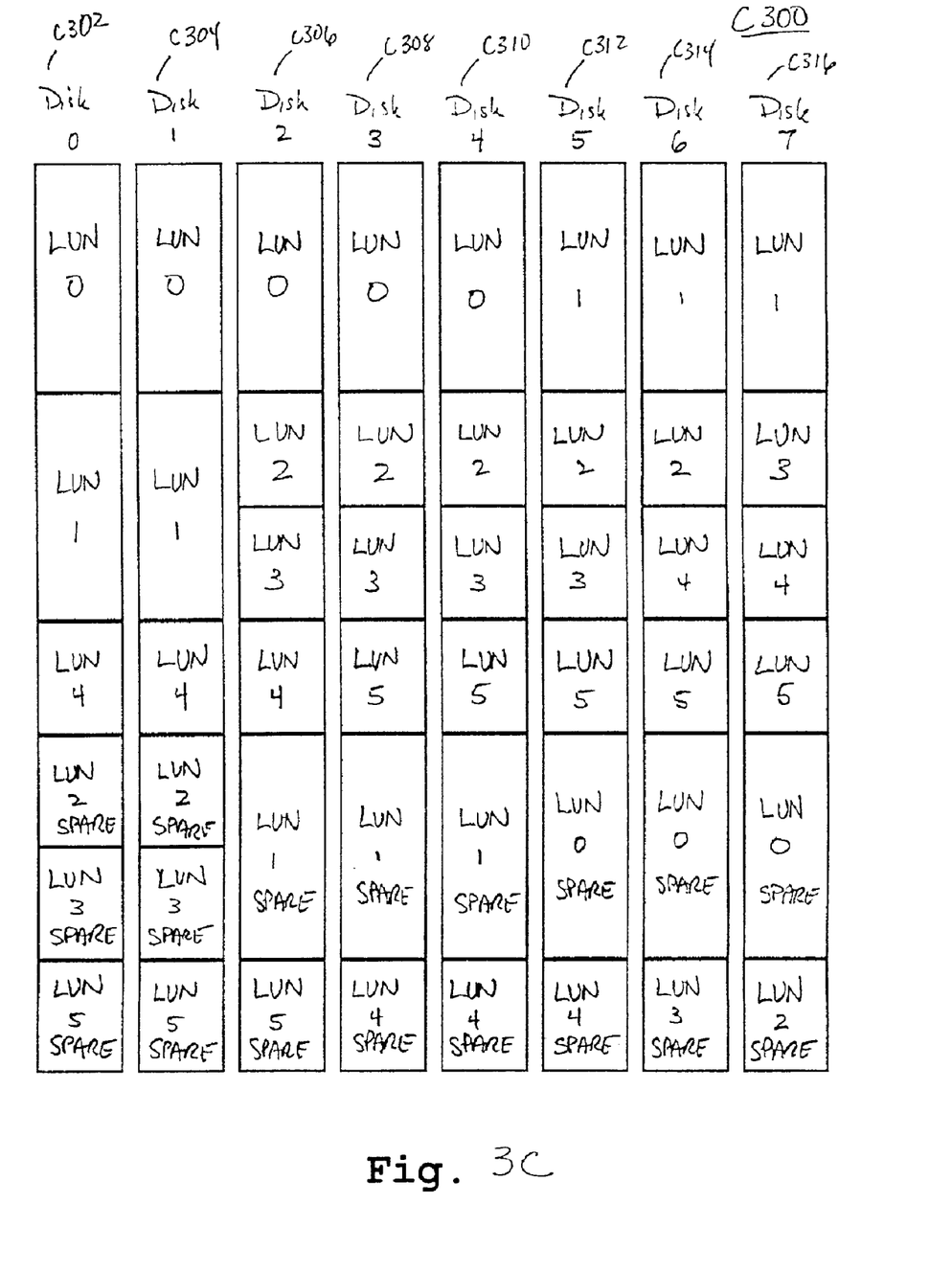
FIG. 3C illustrates a block diagram of an exemplary data storage system distributing data and spare storage in devices divided into six slices, in accordance with one embodiment of the present invention.
Figure 3D:
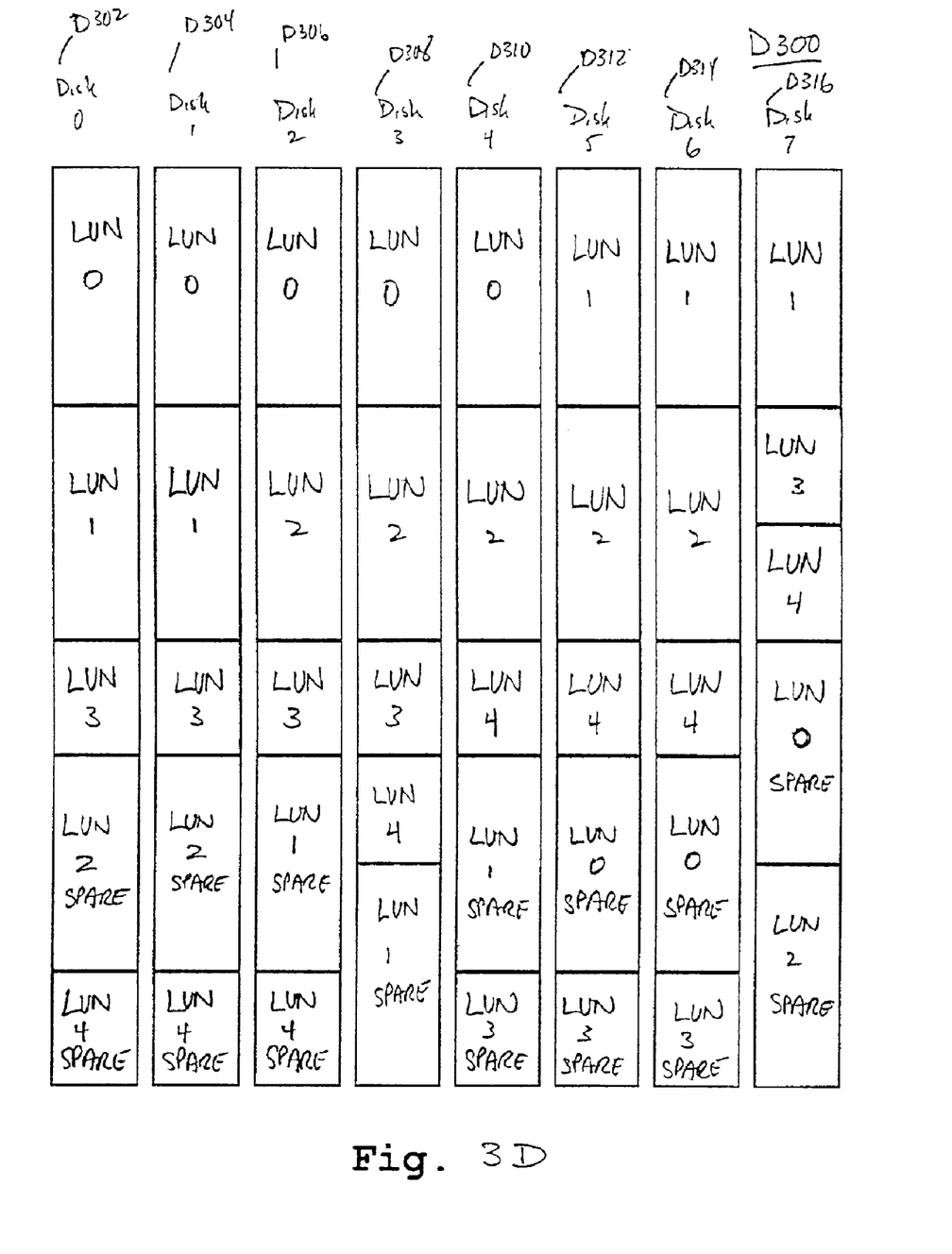
FIG. 3D illustrates a block diagram of an exemplary data storage system distributing data and spare storage in devices divided into five slices, in accordance with one embodiment of the present invention.
Figure 3E:
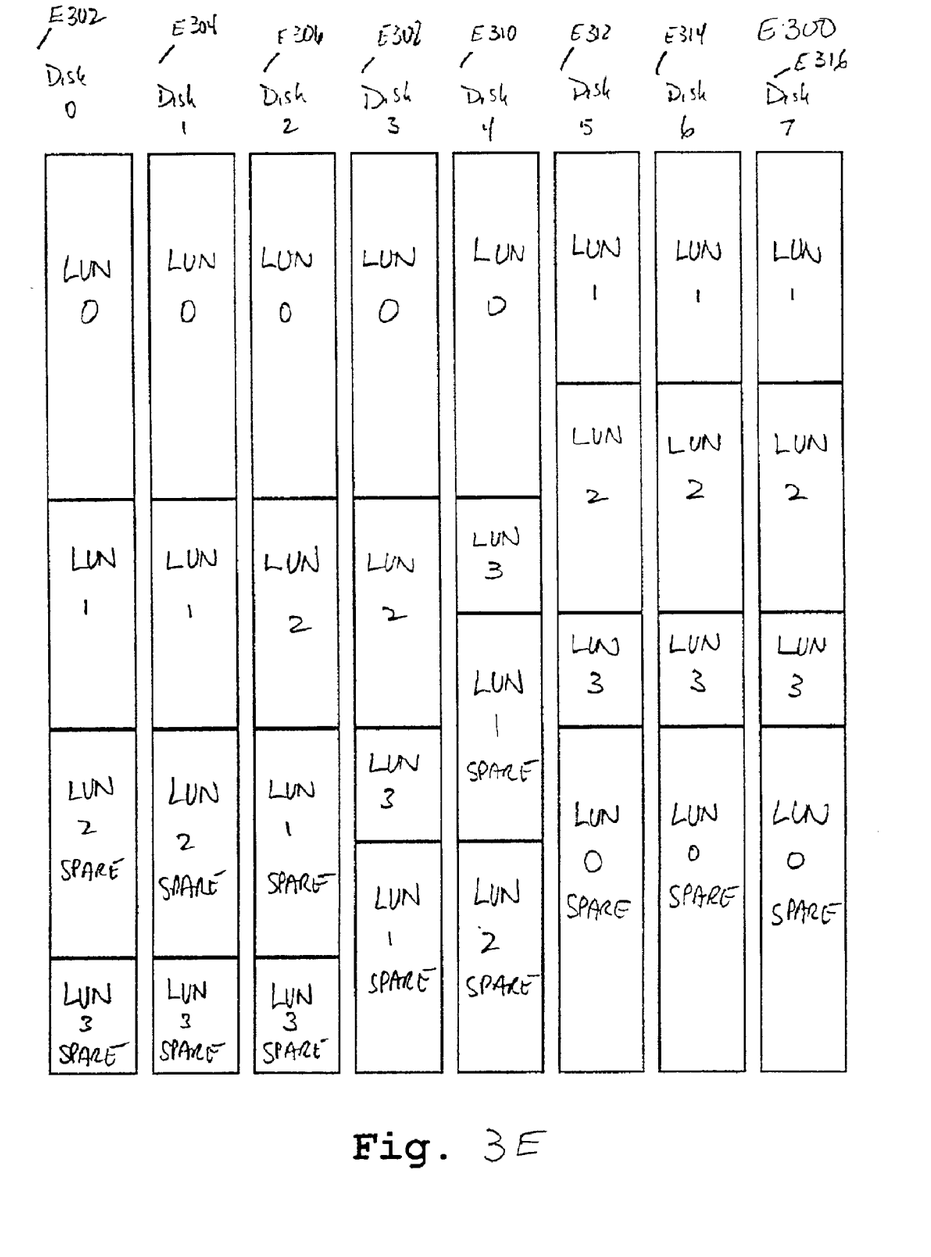
FIG. 3E illustrates a block diagram of an exemplary data storage system distributing data and spare storage in devices divided into four slices, in accordance with one embodiment of the present invention.
Figure 4:
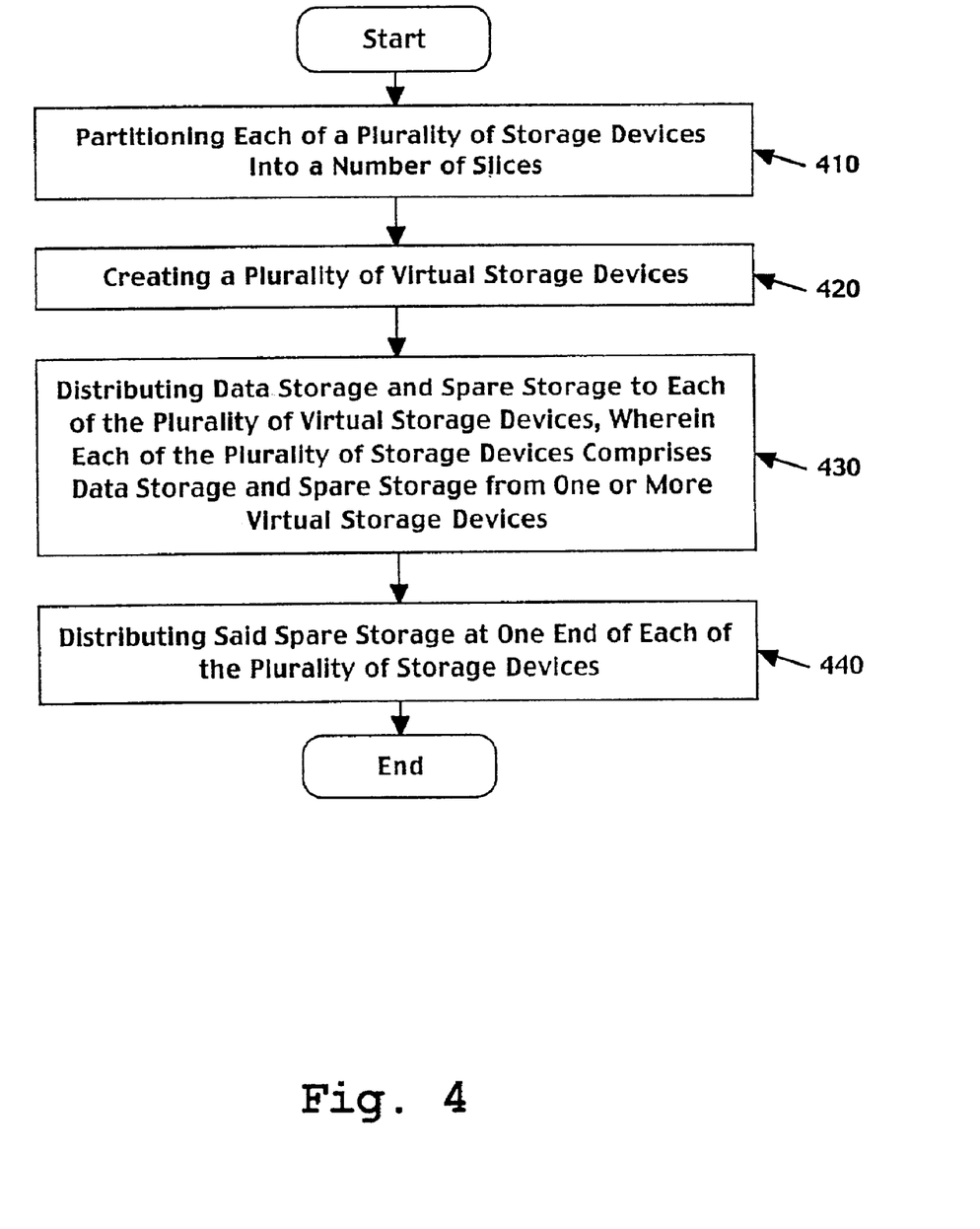
FIG. 4 is a flow diagram illustrating steps in a computer implemented method for distributing data and spare storage in a data storage system, in accordance with an embodiment of the present invention.
Figure 5:
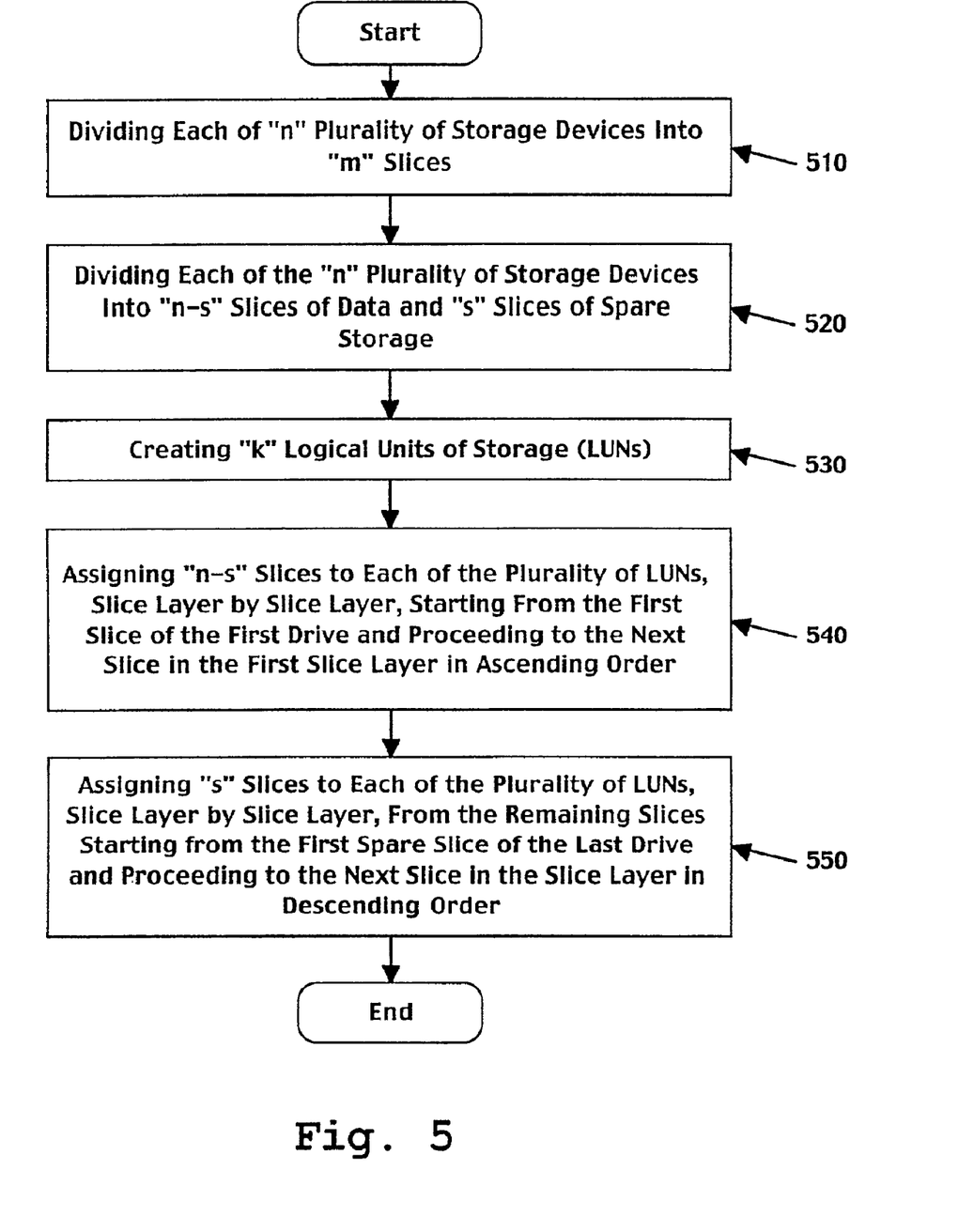
FIG. 5 is a flow diagram illustrating steps in a computer implemented method for distributing data and spare storage in a data storage system, in accordance with an embodiment of the present invention.

The flow charts in FIGS. 4 and 5, in combination with the diagrams in FIGS. 3A through 3E describe a method and apparatus for distributing data and spare storage in a data storage system.

Embodiments of the present invention describe data storage units or devices which implement a Redundant Array of Independent Disks (RAID) 5 configuration. However, it is appreciated that embodiments of the present invention can also utilize storage systems implementing other RAID configurations.

Figure 2:
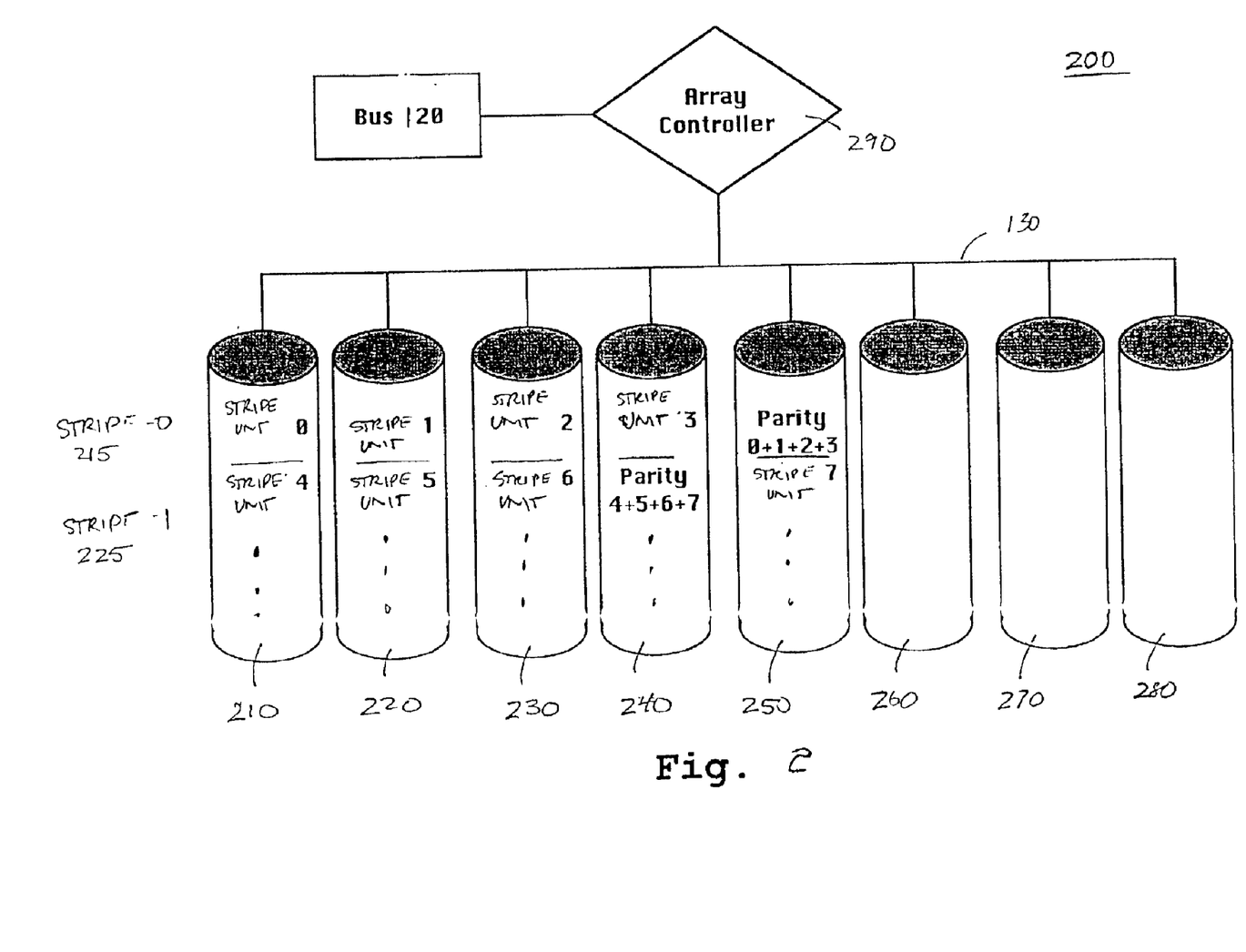
FIG. 2 is a block diagram of a data storage system in a redundant array of independent disks (RAID) level 5 configuration with additional spare disks.

In order to reduce the Mean Time To Repair (MTTR) of an array of storage devices, one or more spare devices are included in an array in order to start the reconstruction of data on a spare device as soon as a device failure is detected. FIG. 2 depicts a exemplary implementation of a data storage system 200 containing spare disks. Data storage system 200 contains eight disks. Five of the disks (e.g., disks 210, 220, 230, 240, and 250) contain data and their redundancies. The remaining three disks (e.g., disks 260, 270, and 280) are spare disks.

Further, in the RAID-5 configuration, system 200 stripes its data across groups of data stripe units. In the redundancy group of stripe-0 215, disk 210 contains stripe unit-0, disk 220 contains stripe unit-1, disk 230 contains stripe unit-2, and disk 240 contains stripe unit-3. Disk 250 in stripe-0 contains the redundancy data for stripe units 0–3. In the RAID-5 configuration, system 200 puts the redundancy data for the next redundancy group associated with stripe-1 225 on disk 240 rather than on disk 250 for the redundancy group. The diagonal striping for the redundancy data is repeated for each subsequent stripe layer.

The data storage system is arranged in a RAID 5 configuration for disks containing data along with three spare disks (disks 260, 270, and 280) in the event of disk failure. The amount of spares included within the system 200 is dependent on factors, such as, total cost of ownership and quality of service. Depending on design needs, a data storage system 200 may embed enough spare disks inside the RAID system 200 to ensure a very low probability that the data storage system 200 will run out of spare devices before the end of its lifetime. The remaining five disks (e.g., disks 210, 220, 230, 240, and 250) contain data and their redundancies.

FIG. 2 also shows an array controller 290 coupled between the storage bus 120 of FIG. 1 and the array of physical disk drives (disks 210, 220, 230, 240, 250, 260, 270 and 280) in a parallel access array, in accordance with one embodiment of the present invention. The array controller 290 is coupled to each of the disk drives in FIG. 2 via external buses 130. The array controller 290 presents one or more virtual storage devices to the host system using the system 200 and distributes the I/O operations to the corresponding member disks. The array controller 290 is also responsible for maintaining the mapping between each of the virtual devices and the individual disk drives in the array.

The array controller basically provides device virtualization, coordinates writing to member disks, and maintains the mapping from the virtual device to the member disk. In addition, the array controller 290 detects the failure of devices within the array.

With enough spare devices put inside an array, individual drive failures can be hidden from the user of the disk array until the spare devices are all used to replace failed drives. These spare devices can be striped for performance enhancements. However, traditional cross diagonal striping of spare storage, similarly used for parity striping, may not perform as well, nor, be as reliable as embodiments of the present invention that stripes spare storage at a particular region within a physical storage device.

In particular, data is spread across all the regions of a storage device, including sectors and tracks, in a system that diagonally stripes spare storage across an array of storage devices. As such, the read/write head(s) in the actuator are traveling over their full range of motion in order to access data. Repeated movement over the entire range increases the total travel of the read/write head(s), and decreases the reliability of the read/write head(s) along with its associated parts.

Moreover, a system that diagonally stripes spare storage across an array of storage devices implementing a random accessing scheme must read throughout the entire storage device. As such, in any implemented random accessing scheme, more active area must be searched on average before the subject data is found. This reduces performance by increasing the average seek time.

On the other hand, by distributing spare storage at a particular region of the storage units or devices within an array, the active area within each of the storage devices in the array can be smaller or more concentrated. In one embodiment, spare storage is allocated across the inner zones of a physical storage device, and data along with its corresponding data redundancy storage is allocated across the outer zones of the physical storage device.

By allocating the storage of data to the outer zones of a physical storage device, the read/write head(s) search over a tighter or smaller area, which reduces the average seek time. Additionally, reliability of read/write head(s) and its associated components can be increased since the read/write head(s) search over a reduced area in the storage device. This, in turn, reduces the range of motion necessitated by the read/write head(s) and reduces the total travel distance associated with the read/write head(s). This can result in faster performance and increased reliability of embodiments of the present invention over data storage systems that store spare storage on independent disks, and over data storage systems that diagonally stripe its spare storage.

One embodiment of the present invention utilizes the flat symmetric layout of an array of data storage devices within a data storage system to distribute data and spare storage. Furthermore, embodiments of the present invention are applied at the slice level for each of the data storage devices within the data storage system. In the present embodiment, the array of data storage devices is comprised totally of n devices. Further, the array is comprised of spare devices which contain spare storage. In one embodiment, the devices within the array are assumed to contain equal capacity for storing data, while other embodiments are well suited to devices within the array having varying data storage capacities. The data storage devices can be, for example, disk drives.

For example, FIG. 3A illustrates an exemplary data storage system containing an array A300 of data storage devices, in one embodiment. The array A300 of data storage devices includes eight disk drives, where n=8, (e.g., disk-0 A302, disk-1 A304, disk-2 A306, disk-3 A308, disk-4 A310, disk-5 A312, disk-6 A314, and disk-7 A316). Three of the disk drives in the array initially contain spare storage (e.g., disk-5 A312, disk-6 A314, and disk-7 A316), where s=3.

In one embodiment of the present invention, each of the data storage devices in the array A300 has the same storage capacity. However, other embodiments of the present invention are well suited to embodiments where the storage devices (e.g., disk drives) have varying storage capacities.

FIG. 4 is a flow diagram 400 illustrating steps in a computer implemented method for striping spare storage in a data storage system, in accordance with one embodiment of the present invention. The present embodiment divides each of a plurality of physical storage devices into a number of slices, in step 410. Each of the slices are associated with a physical space or domain within one of the plurality of physical storage devices of the data storage system.

In one embodiment of the present invention, each of the physical storage devices (e.g., disk drives) of the array of data storage devices (e.g., array A300) are partitioned into slices of equal and uniform capacity. However, other embodiments of the present invention are well suited to partitioning of each of the data storage devices in the array into slices of varying granularities or sizes of capacity.

The present embodiment then creates a plurality of virtual storage devices associated with the array of storage devices in the data storage system, in step 420. In one embodiment the virtual storage device is a logical unit of. storage (LUNs) that are hierarchical in notion. Each of the slices that are associated with a LUN can be further divided into stripe units for the allocation of data.

Each of the LUNs contains data, spare storage, and data redundancy (parity), in one embodiment the present invention. Creation of the LUNs allows for the distribution of data throughout the entire data storage system. For example, the distribution of data that is repeatedly accessed can be more distributed throughout multiple data storage devices within the data storage system rather than concentrating that data on one data storage device.

The assignment of slices for data, data redundancy, and spare storage to each of the LUNs is accomplished in any number of ways. The present embodiment assigns each of the plurality of slices to one of the plurality of LUNs in the array within the data storage system so as to distribute storage of data and spare storage across all of the storage devices within the array of storage devices of the data storage system, in step 430. In particular, the data, data redundancy, and spare storage are distributed to each of the plurality of virtual storage devices (e.g., LUN), such that, each of the plurality of physical storage devices comprises data storage and spare storage from multiple virtual storage devices.

More particularly, the present embodiment distributes spare storage at a region of each of the plurality of physical storage devices, in step 440. As such, for performance and reliability purposes, data is allocated or distributed to outer zones (e.g., in smaller logical block addresses (LBAs)) of each of the physical storage devices, in accordance with one embodiment of the present invention. In another embodiment, the spare storage is allocated or distributed to the inner zones (e.g., larger LBAs) of each of the physical storage devices. These two embodiments may be especially applicable to cases where the data storage devices are zone bit recording (ZBR) drives where there is an increased concentration of bits in the outer zones for storage of data, in one embodiment of the present invention.

Also, the distribution of data, data redundancy, and spare storage across the plurality of physical storage devices in an array is accomplished such that no two slices of data, data redundancy, spare storage that is associated with one virtual storage device is located on the same physical storage device, in one embodiment of the present invention. In particular, a group of data (such as blocks of data located across various storage devices) associated with a redundancy parity, and its associated spares must be located on independent storage devices throughout the array. In this manner, it is ensured that failure of a single physical disk results in a single (recoverable) failure in the redundancy group, and parallel accessing of data is preserved even after failure of some of the storage devices.

FIG. 5 is a flow diagram 500 illustrating steps in a computer implemented method for uniformly striping spare storage in an array of a data storage system, in accordance with one embodiment of the present invention. The flow diagram 500 is an extension of the flow diagram 400 in FIG. 4. Further, diagram 500 in combination with FIGS. 3A-E disclose a method for the distribution of data and spare storage.

The arrays of storage devices consist totally of n storage devices, of which s drives are spare devices containing spare storage. For example, the array A300 in FIG. 3A consists totally of eight (n=8) storage devices (e.g., disk drives A302, A304, A306, A308, A310, A312, A314, and A316). Five of the data storage devices originally were allocated for containing data, and three of the data storage devices originally were allocated for containing spare storage (s=3).

The present embodiment divides each of the plurality of physical storage devices into a number of slices. In particular, each of the n plurality of storage devices (e.g., disk drives) is divided into m slices, in step 510. For example, drive-0 A302 of FIG. 3A is divided into eight slices. In one embodiment, each of the drives (e.g., A302, A304, A306, A3308, A310, A312, A314, and A316) are of equal capacity, and correspondingly, each of the slices contained within each of the drives are of uniform size and capacity.

As such, the slices within the array A300 can be further combined into layers. For example, a slice layer-0 A320 contains the first slices of each of the disk drives within the array A300. The slice layer-1 contains the second slices of each of the disk drives within the array A300. In array A300, eight slice layers are created (e.g., slice layer-0 A320, layer-1 A322, layer-2 A324, layer-3 A326, layer-4 A328, layer-5 A330, layer-6 A332, and layer-7 A334).

In particular, each of the data storage devices within the array A300 contains "m=n=8" slices. In one embodiment, n minus s (n−s) of the slices are allocated for data, in step 520. By way of example, in the array A300, five slices are allocated for data in each of the data storage devices. Correspondingly, s slices are allocated for spare storage, in step 520. By way of example, in the array A300, three slices are allocated for spare storage in each of the data storage devices (e.g., disk A302, A304, A306, A308, A310, A312, A314, and A316.

The present embodiment then divides the entire available data area as defined by each of the slices in the array A300 into k logical units of storage (LUNs), in step 530. By way of example, in the array A300, "k=n=8" LUNs are created (e.g., LUN-0, LUN-1, LUN-2, LUN-3, LUN-4, LUN-5, LUN-6, and LUN-7). In one embodiment, each of the LUNs contains data, data redundancy (parity), and spare storage.

The assignment of slices containing data and spare storage to the LUNs can be done in any number of ways. The following process, by way of example, is in accordance with one embodiment of the present invention. Extensions by symmetry, or other homeomorphic transformation, of the following process for the distribution of data and spare storage are well suited to other embodiments of the present invention. The present embodiment assigns each of the slices in the plurality of physical storage devices to one of the plurality of virtual storage devices. Each of the plurality of virtual storage devices comprises data, data redundancy, and spare storage located in a subset of the plurality of physical storage devices.

In particular, the present embodiment assigns n–s slices to each of the plurality of LUNs, proceeding from slice layer to slice layer after assigning all of the slices in a particular slice layer, in step 540. The assignment of slices in step 540 begins with the first slice of the first drive and proceeds to the next drive at that slice layer until all the slices are assigned at that slice layer. The process then wraps around to the next slice layer and begins again with the second slice of the first drive, and so on until all the slices allocated for containing data have been assigned. The assignment of slices to each of the LUNs occurs in ascending fashion with regards to the drives at each of the slice layers. The assignment of slices starts from the first LUN (LUN-0) and proceeds to the second LUN (LUN-1), until all the LUNs have been assigned slices.

By way of example, array A300, illustrates the assignment of slices to each of the eight LUNs. Starting with the first slice of the first drive-0 A302, the first slice of the each of the first n–s slices in the slice layer-0 A320 are assigned to LUN-0. Since n>s for the array A300, the slice layer-0 A320 will contain all of the slices for LUN-0, as illustrated by the five slices assigned to LUN-0 within slice layer-0 A320 for the containment of data.

The next n–s slices are assigned to the next LUN, in this case LUN-1. By way of example, in array A300, the next three slices in slice layer-0 A320 are assigned to LUN-1. In general, s is much smaller than n, resulting in wrapping around the last drive (disk drive-7 A316) and using the second slice of the first drive (disk drive-0 A302) to continue the assignment of slices to LUN-1. As such, the next two slices in slice layer-1 A322 are assigned to LUN-1.

The process outlined in flow chart 500 is continued until all LUNs have been assigned their required slices for containing data. By way of example, allocation of slices to the eighth LUN (LUN-7) occurs in slice layer-4 A-328 for devices A308, A310, A312, A314, and A316.

In this manner, the allocation of data and data redundancy is accomplished, such that, data and data redundancy from multiple virtual storage devices is allocated to each of the plurality of physical storage devices. Furthermore, the allocation of spare storage from multiple virtual storage devices is allocated to each of the plurality of physical storage devices.

In the present embodiment, each of the LUNs are assigned n–s slices for containing data and data redundancy. Each of the slices are of size D/n where D is the capacity of each of the storage devices (e.g., disk-0 A302). Correspondingly, the remaining s slices on each drive (e.g., drive A302, A304, A306, A308, A310, A312, A314, and A316) are assigned for spare storage.

The distribution of spare storage is accomplished, such that, no two slices of data, or data redundancy, or spare storage from a single virtual storage device is located on a single physical storage device, in another embodiment of the present invention. The assignment of the remaining s slices on each of the drives in the data storage system (e.g., array A300) proceeds in descending fashion, in one embodiment.

The present embodiment assigns s slices to each of the plurality of LUNs, slice layer by slice layer, from the remaining slices, in step 550 of flow diagram 500. The assignment of slices for spare storage starts from the first spare slice of the last drive, and proceeds to the next available slice at that slice layer in descending order of storage devices. Other embodiments of the present invention are well suited to assigning slices for spare storage in ascending order of storage devices.

As such, in the present embodiment, starting from the first spare slice of the last drive, the slices in the preceding s drives are assigned as spare storage for LUN-0. The process of assigning spare storage proceeds by assigning the first available slice on each of the s preceding drives to the following LUNs as spares. When reaching the first drive (disk A302), the assignment of slices wraps around again to the last drive (disk A316) to locate the first available slice.

By way of example, in array A300, slice layer-5 A-330, slice layer-6 A332, and slice layer-7 A334 are available for spare storage. Beginning with the first spare slice on the last drive (slice layer-5 A330; disk A316), that slice is assigned to LUN-0 for spare storage. The slices at slice layer-5 A330 for disks A314, and then A312, are subsequently assigned to LUN-0 for spare storage. Similarly, the slices at slice layer-5 A330 for disk A310, then disk A308, and then disk A306 are subsequently assigned to LUN-1 for spare storage.

For LUN-2, the remaining slices at slice layer-5 A330 for disk A304, and then disk A302 are assigned to LUN-2 for spare storage. The assignment of slices occurs in descending order of storage devices. Continuing with the assignment of the last slice for LUN-2, the present embodiment wraps around the array A300 to the last disk drive A316 for the first available slice, and assigns the slice at slice layer-6 A332 to LUN-2.

The process continues in similar fashion until all LUNs have been assigned s slices for spare storage. As such, LUN-3 is assigned slices at slice layer-6 A332, for disks A314, then A312, and then A310. The LUN-4 is assigned slices at slice layer-6 A332, for disks A308, then A306, and then A304. The LUN-5 is assigned the remaining slice at slice layer-6 A332 and disk A302. Thereafter, LUN-5 is assigned two slices at slice layer-7 A334, for disks A316, and then A314. The LUN-6 is assigned slices at slice layer-7 A334, for disks A312, then A310, and then A308. Finally, the LUN-7 is assigned slices at slice layer-7 A334, for disks A306, A304, and then A302.

In the array A300, all the disk drives (e.g., A302, A304, A306, A308, A310, A312, A314, and A316) are allocated an equal amount of data as well as spare area, in accordance with one embodiment of the present invention. In the present embodiment, unless a failure occurs, the uniform accesses to the array are uniformly distributed across all the disk drives in the array A300, including the spare storage.

In the array A300, an equal portion within each of the disk drives is reserved for spare storage. This can reduce, in normal mode of operation, the maximum distance traveled by an actuator for accessing user data within the array A300. As such, the performance of the array A300 can be enhanced, and the reliability of the array A300 can be increased by restricting the overall movement of the head.

The distribution of data and spare storage in array A300 is performed beneath the RAID layout. Each of the LUNs in the array A300 can be further partitioned or concatenated with other LUNs to form smaller or larger LUNs for defining other RAID attributes like those of striping and/or redundancy, in accordance with another embodiment of the present invention.

The distribution of data and spare storage within an array of storage devices is equally applicable to cases where the number of LUNs varies in comparison to the number of storage devices within the array, in accordance with other embodiments of the present invention.

In one embodiment, an extension of the method illustrated in flow diagram 500 of FIG. 5 exists for the case where the number of LUNs is a multiple of s, the amount of spare storage devices within the array. In the present embodiment, for the case where n is a multiple of s, then n/s defines the number of LUNs needed within the array.

By way of example, FIG. 3B illustrates an exemplary data storage system containing an array B300 of data storage devices. The B300 of data storage devices includes eight disk drives, where n=8, (e.g., disk-0 B302, disk-1 B304, disk-2 B306, disk-3 B308, disk-4 B310, disk-5 B312, disk-6 B314, and disk-7 B316). Two of the disk drives in the array are initially configured for containing spare storage (e.g., disk-6 B314, and disk-7 B316), where s=2.

In the present embodiment, four LUNs are created from the formula n/s, where n=8 and s=2. Each of the data storage devices in B300 can be partitioned into m slices, where m=8, as described in step 510 of flow diagram 500. However, the allocation of slices within each of the storage devices is adjusted to accommodate the number of LUNs created. In the present embodiment, each of the LUNs are assigned twelve slices for the containment of data. Correspondingly, four slices are assigned to each of the LUNs for the containment of spare storage.

The assignment of slices to each of the LUNs for containing data proceeds according to step 540 of flow diagram 500. As such, in array B300, LUN-0 is assigned all of the slices at slice layer-0 B320, and four of the slices at slice layer-1 B322 located at disks B302, B304, B306, and B308. The LUN-1 is assigned the remaining slices at slice layer-1 B322 and all the slices at slice layer-2 B324. The LUN-2 is assigned all of the slices at slice layer-3 B326, and four of the slices at slice layer-4 B328 located at disks B302, B304, B306, and B308. Finally, the LUN-3 is assigned the remaining slices at slice layer-4 B328 and all the slices at slice layer-5 B330.

The assignment of slices to each of the LUNs for containing spare storage proceeds according to step 550 of flow diagram 500. As such, in array B300, LUN-0 is assigned in descending order the slices at slice layer-6 B332 located at disks B316, then B314, B312, and finally at B310. The LUN-1 is assigned in descending order the slices at slice layer-6 B332 located at disks B308, then B306, B304, and finally at B302. Similarly, the LUN-2 is assigning in descending order the slices at slice layer-7 B334 located at disks B316, then B314, B312, and finally at B310. The LUN-3 is assigned in descending order the slices at slice layer-7 B334 located at disks B308, then B306, B304, and finally at B302.

The distribution of data and spare storage within an array of storage devices is equally applicable to cases where the number of LUNs varies in comparison to the number of storage devices within the array, and the distribution of data and spare storage varies in granularity between the storage devices within the array of storage devices, in accordance with other embodiments of the present invention. FIGS. 3C, 3D, and 3E illustrate how the extension and contraction of the number of LUNs requires some compromise in either the uniformity of the distributions across the storage device within the array, the sizes of the LUNs, or the capacity use of the storage devices.

FIG. 3C illustrates an exemplary data storage system containing an array C300 of data storage devices. The array C300 of data storage devices includes eight disk drives, where n=8, (e.g., disk-0 C302, disk-1 C304, disk-2 C306, disk-3 C308, disk-4 C310, disk-5 C312, disk-6 C314, and disk-7 C316). Three of the disk drives in the array are initially configured for containing spare storage (e.g., disk-5 C312, disk-6 C314, and disk-7 C316), where s=3.

The array C300 is divided into six LUNs, by selection. This selection is sometimes dictated by an existing environment (e.g., operating system) or tool (existing RAID code). The uniformity of the sizes of the slices within the LUNs is compromised with the selection of the creation of six LUNs. The process of distributing spare storage and data throughout the array C300 generally follows the method outlined in flow diagram 500. However, steps 510, 520, and 530 are modified to accommodate the six LUNs and the varying granularities of physical space allocated within each of the LUNs. In general, the creation of slices within each storage device follows the ratio of (n−s):s. As such, the ratio (n−s):s defines the allocation of space for data versus the space for spare storage within a LUN, and within each of the storage devices (e.g., disk C302, C304, C306, C308, C310, C312, C314, and C316) within the array.

The assignment of slices within the array C300 generally follows the steps 540 and 550 outlined in flow diagram 500. In one embodiment, as generally applicable, slices for data for a particular LUN appear on different storage devices, as in the case for parallel access. Also, slices for spare storage for a particular LUN appear on different storage devices, as in the case for parallel access.

FIGS. 3D, and 3E illustrate the nonuniform distribution of data storage and spare storage across all of the storage devices within their respective arrays. FIG. 3D illustrates an exemplary data storage system containing an array D300 of data storage devices. The array D300 of data storage devices includes eight disk drives, where n=8, (e.g., disk-0 D302, disk-1 D304, disk-2 D306, disk-3 D308, disk-4 D310, disk-5 D312, disk-6 D314, and disk-7 D316). Three of the disk drives in the array are initially configured for containing spare storage (e.g., disk-5 D312, disk-6 D314, and disk-7 D316), where s=3.

The array D300 is divided into five LUNs, by selection. Each of the LUNs is divided according to the ratio (n−s):s for the allocation of space for data versus the space for spare storage within a LUN. Correspondingly, each of the storage devices (e.g., disk D302, D304, D306, D308, D310, D312, D314, and D316) within the array D300 is divided according also to the ratio (n−s):s for the allocation of space for data and spare storage. The uniformity of the sizes of the slices and their distribution within the LUNs in the array D300 is compromised with the selection of the creation of five LUNs. As noted from FIG. 3C, each slice allocated to LUN0 and LUN1 is twice as big in capacity as the slices allocated to other LUNs.

FIG. 3E illustrates an exemplary data storage system containing an array E300 of data storage devices. The array E300 of data storage devices includes eight disk drives, where n=8, (e.g., disk-0 E302, disk-1 E304, disk-2 E306, disk-3 E308, disk-4 E310, disk-5 E312, disk-6 E314, and disk-7 E316). Three of the disk drives in the array initially are configured for containing spare storage (e.g., disk-5 E312, disk-6 E314, and disk-7 E316), where s=3.

The array E300 is divided into four LUNs, by selection. Each of the LUNs is divided according to the ratio (n–s):s for the allocation of space for data versus the space for spare storage within a LUN. Correspondingly, each of the storage devices (e.g., disk E302, E304, E306, E308, E310, E312, E314, and E316) within the array E300 is divided according also to the ratio (n–s):s for the allocation of space for data and spare storage. The uniformity of the sizes of the slices and their distribution within the LUNs in the array E300 is compromised with the selection of the creation of the four LUNs.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random access Memory (RAM) devices; optical storage elements, magnetic storage elements, magneto-optimal storage elements, flash memory, core memory and/or other equivalent storage technologies without departing from the present invention. Such alternative storage devices should be considered equivalents.

While the methods of embodiments illustrated in flow chart 400 and 500 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Embodiments of the present invention, distributing data and spare storage in a data storage system, is thus described. While the present invention has been described in particular embodiments, it should be appreciated that the present invention should not be construed as limited by such embodiments, but rather construed according to the below claims.

What is claimed is:

1. A computer storage system comprising:
    a plurality of physical storage devices for data storage and spare storage, each of said plurality of storage devices having a region for distributing spare storage;
    a plurality of virtual storage devices, each comprising storage space in one or more of said plurality of physical storage devices, wherein each of said plurality of virtual storage devices comprises data storage and spare storage, and wherein each of said plurality of physical storage devices comprises data storage, data redundancy storage, and spare storage for one or more of said plurality of virtual storage devices; and
    a controller for controlling data storage, data redundancy storage, and spare storage assignment over said physical storage devices.

2. The computer storage system as described in claim 1, wherein each of said plurality of physical storage devices is a disk drive.

3. The computer storage system as described in claim 1, wherein each of said plurality of virtual storage devices is a logical unit of storage (LUN).

4. The computer storage system as described in claim 1, wherein data storage and data redundancy storage in each of said plurality of virtual storage devices is arranged in a Redundant Array of Independent Disks (RAID) configuration.

5. The computer storage system as described in claim 1, wherein said region is an inner zone of each of said plurality of physical storage devices.

6. The computer storage system as described in claim 1, wherein each of said virtual storage devices comprises data storage, data redundancy storage, and spare storage.

7. The computer storage system as described in claim 1, wherein said data storage and said spare storage is distributed uniformly across all of said plurality of physical storage devices.

8. A computer storage system comprising:
    a plurality of physical storage devices for data storage and spare storage, each of said plurality of storage devices having a region for distributing spare storage;
    a plurality of virtual storage devices, each comprising storage space in one or more of said plurality of physical storage devices, and wherein each of said plurality of physical storage devices comprises data storage, data redundancy storage, and spare storage for one or more of said plurality of virtual storage devices; and
    a controller for controlling data storage, data redundancy storage, and spare storage assignment over said physical storage devices;
    wherein said data storage and said spare storage is distributed in varying granularities across all of said plurality of physical storage devices.

9. A method of distributing storage in a data storage system, comprising:
    a) creating a plurality of virtual storage devices wherein each of said virtual storage devices comprises storage space located in a subset of a plurality of physical storage devices, wherein each of said plurality of virtual storage devices comprises data storage and spare storage;
    b) distributing data storage, data redundancy storage, and spare storage to each of said plurality of virtual storage devices, wherein each of said plurality of storage devices comprises data storage, data redundancy storage, and spare storage from multiple virtual storage devices; and
    c) distributing said spare storage at a region of each of said plurality of physical storage devices.

10. The method of distributing storage as described in claim 9, wherein each of said plurality of physical storage devices is a disk drive.

11. The method of distributing storage as described in claim 9, wherein each of said plurality of virtual storage devices is a logical unit of storage (LUN).

12. The method of distributing storage as described in claim 9, further comprising:
    arranging said data and said data redundancy in each of said plurality of virtual storage devices in a Redundant Array of Independent Disk (RAID) configuration.

13. The method of distributing storage as described in claim 9, wherein said region is an inner zone of each of said plurality of physical storage devices.

14. The method of distributing storage as described in claim 9, wherein b) further comprises:
uniformly distributing said data storage, said data redundancy storage, and said spare storage across all of said plurality of storage devices.

15. A method of distributing storage in a data storage system, comprising:
a) creating a plurality of virtual storage devices wherein each of said virtual storage devices comprises storage space located in a subset of a plurality of physical storage devices;
b) distributing data storage, data redundancy storage, and spare storage in varying granularities across all of said plurality of storage devices to each of said plurality of virtual storage devices, wherein each of said plurality of storage devices comprises data storage, data redundancy storage, and spare storage from multiple virtual storage devices; and
c) distributing said spare storage at a region of each of said plurality of physical storage devices.

16. The method of distributing storage as described in claim 9, wherein b) further comprises:
distributing said data storage, said data redundancy storage, and said spare storage wherein no more than one data storage, or data redundancy storage, or spare storage associated with a particular virtual storage device is distributed to the same physical storage device.

17. A method of distributing storage in a data storage system, comprising:
a) dividing each of a plurality of physical storage devices into a number of slices;
b) assigning each slice in said plurality of physical storage devices to one of a plurality of virtual storage devices, wherein each of said plurality of virtual storage devices comprises data storage and spare storage from a subset of said plurality of physical storage devices,
c) allocating data storage from multiple virtual storage devices to slices in a first region of each of said plurality of physical storage devices; and
d) allocating spare storage from multiple virtual storage devices to slices in a second region of each of said plurality of storage devices.

18. The method of distributing storage as described in claim 17, wherein c) further comprises:
allocating equal amounts of data storage to each of said plurality of virtual storage devices, and correspondingly each of said plurality of physical storage devices; and
wherein d) further comprises:
allocating equal amounts of spare storage to each of said plurality of virtual storage devices.

19. The method of distributing storage as described in claim 17, wherein each of said plurality of physical storage devices is a disk drive.

20. The method of distributing storage as described in claim 17, wherein said data storage comprises data and data redundancy.

21. The method of distributing storage as described in claim 20, wherein each of said plurality of physical storage devices comprises not more than one slice of data storage or spare storage from each of said plurality of virtual storage devices.

22. The method of distributing storage as described in claim 17, further comprising:
concatenating two or more virtual storage devices.

23. The method of distributing storage as described in claim 17, wherein said second region is an outer zone of each of said plurality of physical storage devices.

24. The method of distributing storage as described in claim 17, wherein said second region is an inner zone of each of said plurality of physical storage devices.

25. The method of distributing storage as described in claim 17, wherein c) further comprises:
distributing said data storage and said spare storage wherein no more than one slice containing data storage or spare storage that is associated with a particular virtual storage device is distributed to the same physical storage device.

26. A data storage system, comprising:
a processor; and
a computer readable memory coupled to said processor wherein said memory contains program instructions that when executed implements a method of distributing storage in said data storage system, comprising:
a) creating a plurality of virtual storage devices wherein each of said virtual storage devices comprises storage space in one or more of a plurality of storage devices;
b) distributing data storage and spare storage to each of said plurality of virtual storage devices, wherein each of said plurality of storage devices comprises data storage and spare storage from one or more virtual storage devices; and
c) distributing said spare storage at one end of each of said plurality of storage devices.

27. The data storage system as described in claim 26, wherein each of said plurality of storage devices is a disk drive.

28. The data storage system as described in claim 26, wherein each of said plurality of virtual storage devices is a logical unit of storage (LUN).

29. The data storage system as described in claim 26, wherein said data storage comprises data and data redundancy.

30. The data storage system as described in claim 29, wherein said method further comprising:
arranging said data and said data redundancy in each of said plurality of virtual storage devices in a Redundant Array of Independent Disks (RAID) configuration.

31. The data storage system as described in claim 26, wherein said one end is an inner zone of each of said plurality of storage devices.

32. The data storage system as described in claim 26, wherein b) in said method further comprises:
uniformly distributing said data storage and said spare storage across all of said plurality of storage devices.

33. The data storage system as described in claim 26, wherein b) in said method further comprises:
distributing said data storage and said spare storage in varying granularities across all of said plurality of storage devices.

34. The data storage system as described in claim 26, wherein b) in said method further comprises:
distributing said data storage and said spare storage wherein no more than one data storage or spare storage associated with a particular virtual storage device is distributed to the same storage device.

* * * * *